R. C. SMITH.
LIQUID LEVEL INDICATOR.
APPLICATION FILED MAY 11, 1911.
1,075,510.
Patented Oct. 14, 1913.
2 SHEETS—SHEET 1.
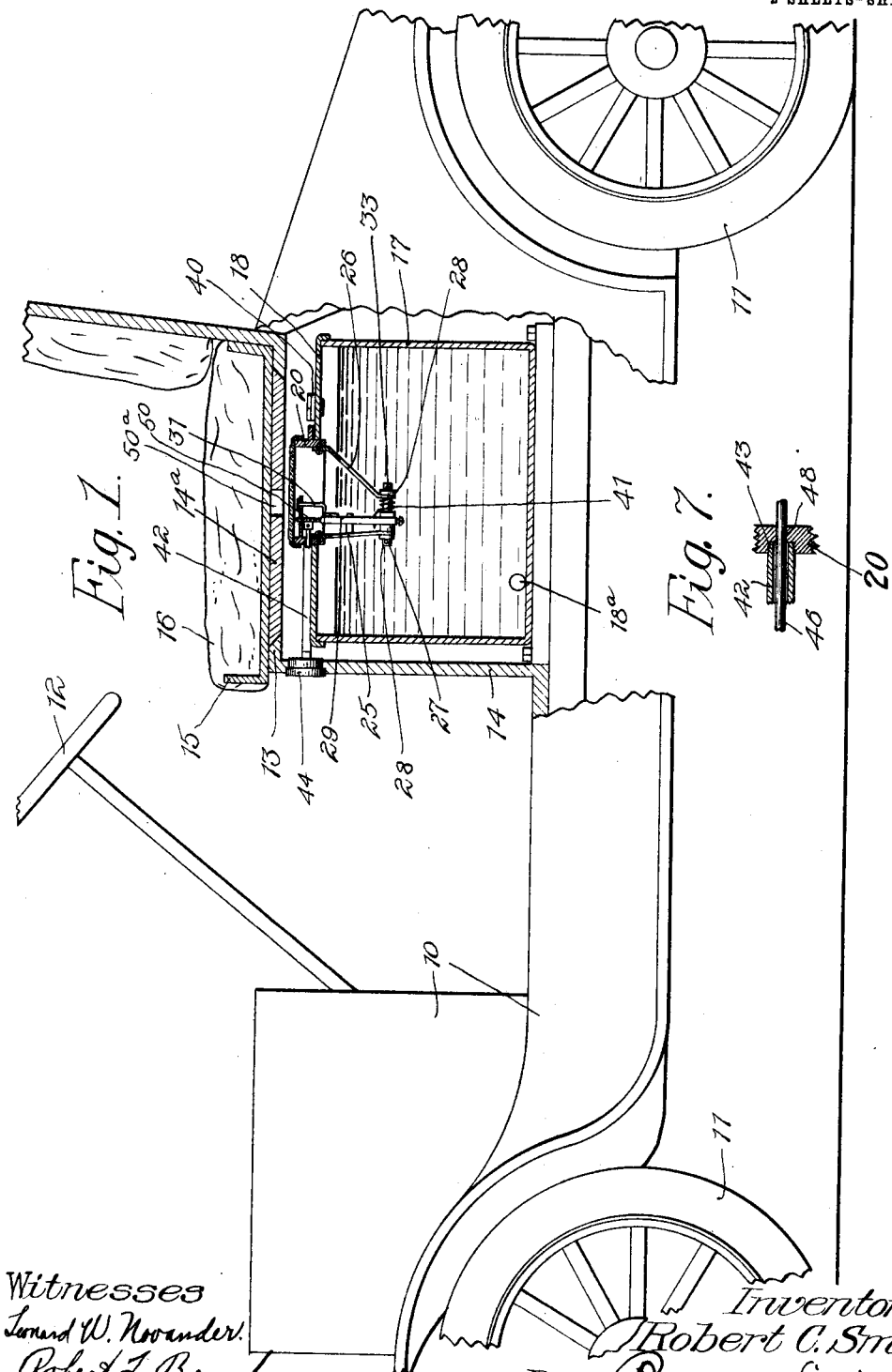
Witnesses
Leonard W. Novander
Robert L. Bracke
Inventor
Robert C. Smith
By Brown & Williams
Attorneys

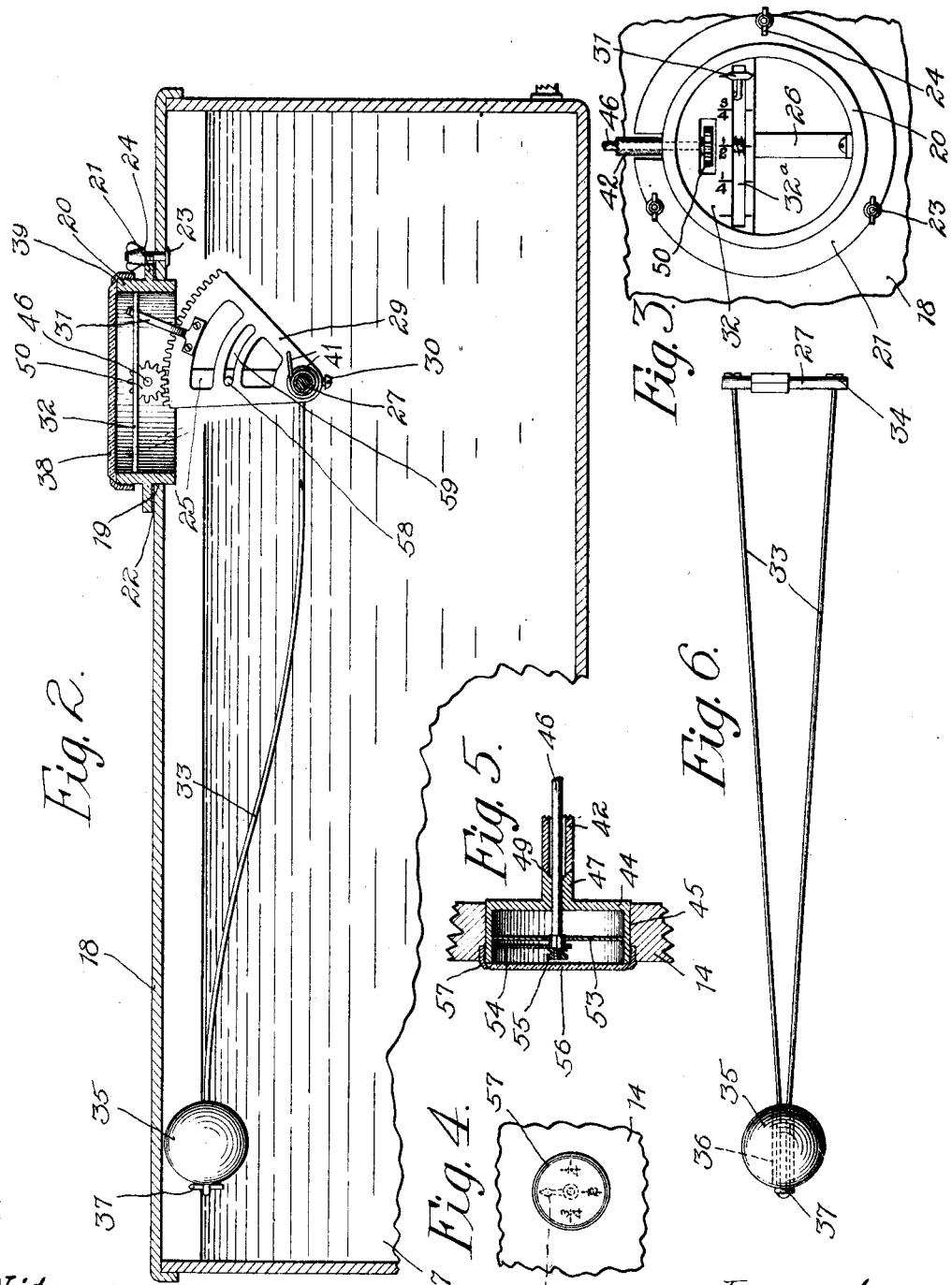

UNITED STATES PATENT OFFICE.

ROBERT C. SMITH, OF OAK PARK, ILLINOIS.

LIQUID-LEVEL INDICATOR.

1,075,510.  Specification of Letters Patent.  Patented Oct. 14, 1913.

Application filed May 11, 1911. Serial No. 626,545.

*To all whom it may concern:*

Be it known that I, ROBERT C. SMITH, a citizen of the United States, residing at Oak Park, in the county of Cook and State of Illinois, have invented certain new and useful Improvements in Liquid-Level Indicators, of which the following is a full, clear, concise, and exact description, reference being had to the accompanying drawings, forming a part of this specification.

My invention relates to liquid level indicators and has to do particularly with devices of that kind which is employed in automobiles in association with the gasolene tank.

The object of my invention is, first, to provide an indicator or gage, for the gasolene tank, which is constantly exposed to the view of the operator even while he is driving the machine. To this end, I provide an arrangement wherein the indicator dial is mounted in the riser of the front seat of the automobile, the indicating hand or pointer being connected with a float inside the gasolene tank by means of novel mechanism which will be described in detail.

The second object of my invention is to provide what I term a "duplex gage", that is, a gage which includes means for indicating the liquid level in the gasolene tank at a position which can be observed by the operator when he is driving the machine and also means for giving the indication at a position which can be kept in view during the process of filling the tank. It is quite common in the art to place the gasolene tank under the front seat of the vehicle and to provide the seat with a cover which is removable to expose the tank, the seat cushions being disposed over this cover after it has been placed in position. One of the indicators in the duplex gage of my invention is disposed on the top of the tank and is exposed to view when the cushions and the seat cover have been removed. Such removal is, of course, necessary when it is desired to fill the tank and, as the tank is being filled, this indicator can be watched to ascertain the rising level of the liquid. After the tank is filled, the cover and the cushions are again disposed in place and the operator may keep himself informed of the liquid level, as the gasolene is being used, by means of the other indicator which, as before stated, is located in the riser of the seat and which is exposed forwardly. In this way, the operator may always know of the amount of gasolene in the tank, while the machine is running, and this without the necessity of removing the cushions and the cover of the seat. The indicator in the riser indicates the falling level of the liquid, while the machine is running, and the indicator on the top of the tank indicates the rising level of the gasolene while the tank is being filled.

My invention contemplates other improvements.

The specific mechanism which is employed to carry out the objects above set forth is new and secures advantages not heretofore obtained. I provide improved means for supporting and for controlling the float, and the mechanism which I employ for transmitting the movement of the float to the indicators is peculiarly adapted to the objects above set forth. My invention is consistent with the ideas of economical construction and simple operation, few parts being employed to eliminate the possibility of disarrangement so far as possible and to provide for ready access in the cases of inspection and repair.

My invention is embodied in the structure illustrated in the accompanying drawings, in which—

Figure 1 is a general elevational view of an automobile supplied with the device of my invention, parts being shown in section to reveal the interior construction, the gasolene tank being thus shown in transverse section; Fig. 2 is a longitudinal sectional view of the gasolene tank, showing the parts of my invention applied thereto; Fig. 3 is a fragmentary plan view of the top of the tank, showing the indicator thereon; Fig. 4 is a fragmentary elevational view of the riser of the seat, showing the indicator thereon; Fig. 5 is an axial sectional view of the riser indicator and the directly associated parts; Fig. 6 is a plan view of the float arm and the float; and Fig. 7 is an axial sectional view of a detail of construction which will be described.

Like reference characters are applied to the same parts throughout the various figures.

The frame of the automobile is illustrated at 10 in Fig. 1, the wheels at 11, 11, and the steering wheel at 12. The front seat of the vehicle is illustrated at 13, this seat being mounted in place in any convenient manner at the top of the riser 14. The seat 13 is provided with an opening which is normally closed by a cover 14ª, and the cushion frame 15, which carries the cushions 16, rests upon the covered seat. The gasolene tank is of general rectangular prismatic form and is illustrated at 17, this tank being disposed under the front seat referred to and having its longer dimension extending transversely of the car. The tank has the usual outlet 18ª, which leads to the float chamber of the carbureter, and the cover 18 which is held in place in any convenient manner.

The cover 18 is provided with a circular opening 19 in which a supporting frame 20 is snugly disposed, this frame having the annular flange 21 resting upon the cover as best illustrated in Fig. 2. A suitable annular gasket 22 is disposed between the flange 21 and the cover 18, so as to secure a tight fit, and the frame is held in place securely by means of bolts 23, 23 passing through peripheral notches in the flange and supplied with winged clamping nuts 24, 24. Secured to the supporting frame 20 and extending downwardly therefrom are two supporting arms 25 and 26 which, at their lower ends, carry a shaft 27 held against lateral displacement by means of collars 28, 28. Between the arms 25 and 26, a gear segment 29 is secured to the shaft 27, being set in place by means of a set screw 30. This segment is provided with a pointer 31, extending radially therefrom and secured thereto in any suitable manner, and this pointer extends upwardly into the annular frame 20 so that it may operate in an arc near the top of the frame. A dial 32 is mounted in a horizontal plane in the annular frame 20 on one side thereof, and is slotted at 32ª for the passage of the pointer 31.

The float arm is secured upon the shaft 27. For a purpose which I shall point out presently, I prefer to make this float arm of wire and, as shown in Figs. 1, 2 and 6, this part comprises the wire 33 which is bent back upon itself in a narrow V-shape and which is secured at its ends to the ends of the shaft 27 where they extend beyond the supporting arms. The wire may be held in place by a tight friction fit and the ends may be split and bent over on the shaft as illustrated at 34, 34. The float 35 is preferably spherical, conveniently a hollow ball, and is provided with a walled diametrical passageway 36 through which the end of the float arm 33 may extend. Near this end of the float arm, the wire members comprising it are made substantially parallel so that they may pass through the opening in the float and from the point where they leave the float they are made to diverge, as illustrated in Fig. 6, so as to limit the distance which the float may be passed on over it.

A cotter pin 37 passes through the resulting loop extending beyond the float, to hold the float in place. It will now be seen that with proper adjustment, the movement of the float may be indicated on the dial by the directly associated pointer 31, the dial being marked with significant characters, as illustrated in Fig. 3, to tell the liquid level. Since the float arm extends longitudinally of the tank and is made quite long compared to the distance between the axis of the shaft 27 and the end of the pointer, the considerable movement of the float from the top of the tank to a point near the bottom will be proportionately reduced to the range of the dial 32. The glass cover 38, with a beveled edge, rests upon the annular frame 20 and a clamping ring 39, having screw-threaded engagement with the annular frame, engages the cover, as shown in the drawings, to clamp it in place. The gasolene may be introduced into the tank either by removing the clamping ring 39 and the glass cover 38 or by removing a screw cap 40 which normally closes another opening in the tank. When it is desired to fill the tank the cushions 16 and the cover 14ª are removed and, during the operation of filling, the indicator which has just been described is in full view so that the rise of the liquid level can be watched.

In order that the float 35 need not be heavy or large, and in order that the float may always properly follow the falling of the liquid level, I provide upon the shaft 27 a helical spring 41, one end of the spring having connection with the segment 29, and consequently with the shaft, and the other end having connection with the supporting arm 26. The tendency of this spring is to rotate the shaft in a counter-clockwise direction (Fig. 2) and it is so adjusted that the rising of the liquid level will easily overcome it. As the liquid level falls, however, the spring assists the weight of the float so that there will be no difficulty in overcoming the friction of the operating parts. The V-shape of the float arm is important in that it resists the effect of the side thrust of the gasolene, when the automobile is running, and the wire construction is important in that its resistance is more or less resilient, thus reducing the wear and tear upon the operating parts. This construction is further useful in that the float may easily be removed for the purposes of inspection and repair and in fact the float arm can be removed easily and may be withdrawn through the remaining opening in the frame 20.

Extending forwardly from the annular supporting frame 20, toward the riser of the seat, is a tube 42 which is secured to the cover 18 in some suitable manner and is screwed into the frame as illustrated at 43, Fig. 1. At its forward end this tube connects with the casing 44 of a second indicator dial, this casing being preferably of the "watch case" type and being set in an axially alining opening 45 in the riser 14. A shaft 46 is mounted with a bearing fit in a boss 47 extending rearwardly from the casing 44 and with a bearing fit in the frame piece 20 as indicated at 48. This arrangement provides for a gasolene-tight fit. At the forward end the tube 42 is preferably chamfered into conical form to correspond with a conical depression in the boss 47 as indicated at 49. The shaft 46, where it extends inside the annular frame piece 20 below the dial 32, is provided with a pinion 50 rigidly secured thereto and meshing with the gear segment 29 as clearly illustrated in Fig. 2. At its forward end the shaft 46 extends into the casing 44, beyond the dial 53 therein, where it is provided with an indicator hand 54 held in place thereon by means of a thumb nut 55. The front of this casing is provided with the glass cover 56 held in place by a clamping ring 57, the riser 14 being counter-sunk to provide for the proper disposition of this clamping ring. It is thus seen that the motion of the segment 29, and consequently that of the float, is transmitted by way of the pinion to the shaft 46 and thence to the indicator hand at the riser dial. This dial is marked with significant characters, as indicated in Fig. 4, to tell the level of the liquid. The removal of the cover 56 of the riser dial case and of the thumb nut 55 permits the dial case to be removed for the purposes of inspection and repair.

It will now be evident that the motion of the float is indicated not only on the dial on the top of the tank but also at the dial in the riser and that the driver of the machine can be informed of the level of the gasolene while he is running the machine and without removing the cushions or the cover of the seat. It is preferable that the dial indicate "empty" when there is still some gasolene in the tank and to this end I adjust the float relatively to the pointer so that such indication will be made when the float is an inch or two from the bottom of the tank. The movement of the segment 29 is limited by means of the pin 58 which extends from the supporting arm 25 and into a circular slot 59 in the segment. The cover 14ª may be provided with an opening 50ª to expose the dial on the top of the gasolene tank when the cushions are removed.

I claim as new and desire to secure by Letters Patent:

1. In combination, a tank, a shaft supported in said tank, a float arm extending from said shaft, a float on said arm, a gear segment on said shaft, a pinion meshing with said segment, a shaft for said pinion extending beyond the tank, a pointer on said pinion shaft, a dial associated with said pointer, a second pointer carried by said segment, and an exposed dial associated with said second pointer.

2. In combination, a tank having an opening in the top thereof, an annular fitting in said opening, supporting arms extending downwardly from said fitting, a shaft mounted in said supporting arms, a float arm extending from said shaft, a float on said arm, a gear segment on said shaft, a pinion meshing with said segment, a shaft for said pinion extending beyond the tank, a pointer on said pinion shaft, a dial associated with said pointer, a second pointer carried by said segment and extending upwardly into said fitting, a dial associated with said second pointer in said fitting, and a glass top for said fitting.

3. In combination, a tank, a shaft supported in said tank, indicating mechanism associated with said shaft, a V-shaped wire float arm extending from said shaft, a hollow ball with a walled diametrical opening passed over the end of said arm, and a cotter pin holding said ball in place.

4. In combination, a tank having an opening in the top thereof, an annular fitting in said opening, an oscillating shaft supported by said fitting, a float arm in the form of two wires extending from said shaft, a float at the end of said wires, a dial case rigidly carried with said fitting, and a pointer in said case mechanically connected with said shaft.

5. In combination, an annular fitting for attachment to the top of a tank having an opening, a tube secured to and extending radially from said fitting, a shaft mounted in said tube, a dial case carried on the end of said tube, a pointer mounted upon said shaft in said dial case, a float arm connected with the other end of said shaft which extends into said fitting, and a float carried by said float arm.

6. In combination, a fitting for attachment to the wall of a tank having an opening therein, an oscillating shaft supported by said fitting, a float arm movable with said shaft, a float on said arm, a dial case rigidly carried with said fitting, and a pointer in said case rigidly connected with said shaft.

7. In combination, a fitting for attachment to the wall of a tank having an opening therein, a dial case, a tubular member rigidly connecting said dial case and said fitting, an oscillating shaft journaled within said tubular member, a float arm mechanically connected with said shaft at the fitting end thereof, a float on said arm, and a pointer in said case mechanically connected with said shaft.

8. In combination, a fitting for attachment to the wall of a tank having an opening therein, said fitting being adapted to close said opening, a closed dial case, a tubular member connecting the interior of said fitting with the interior of said dial case and rigidly uniting said parts, an oscillating shaft journaled within said tubular member, a float arm mechanically connected with said shaft at the fitting end thereof, a float on said arm, and a pointer in said dial case mechanically connected with said shaft.

9. In combination, a fitting for attachment to the top of a tank having an opening therein, a tubular member extending laterally from said fitting, an oscillating shaft journaled within said member, a float arm connected to said shaft, a float on said arm, a dial case rigidly carried on said member, a pointer in said case mechanically connected with said shaft, and a pointer in said fitting mechanically connected with said shaft.

10. In combination, a fitting for attachment to the wall of a tank having an opening therein, an oscillating shaft supported by said fitting, a float arm extending from said shaft, a float on said arm, resilient means tending to move said float arm downwardly, a dial case rigidly carried with said fitting, and a pointer in said case mechanically connected with said shaft.

11. In combination, an annular fitting for attachment to the wall of a tank having an opening therein, an oscillating shaft supported by and extending radially from said fitting, an arm mechanically connected with said shaft, a float mechanically associated with said arm, a dial case rigidly carried with said fitting, and a pointer in said case mechanically connected with said shaft.

12. In combination, an annular fitting for attachment to the wall of a tank having an opening therein, a tubular member rigidly secured to and extending radially from said fitting, a dial case secured to said member, an oscillating shaft mounted in said tubular member, an arm mechanically connected with said shaft at the fitting end thereof, a float mechanically associated with said arm, and a pointer in said case mechanically connected with said shaft.

In witness whereof, I hereunto subscribe my name this 6th day of May, A. D., 1911.

ROBERT C. SMITH.

Witnesses:
ARTHUR H. BOETTCHER,
ALBERT G. McCALEB.